United States Patent [19]

Schubert

[11] Patent Number: 5,411,656
[45] Date of Patent: May 2, 1995

[54] GAS ABSORPTION ADDITIVES FOR ELECTROPHORETIC SUSPENSIONS

[75] Inventor: Frederic E. Schubert, Shoreham, N.Y.

[73] Assignee: Copytele, Inc., Huntington Station, N.Y.

[21] Appl. No.: 106,395

[22] Filed: Aug. 12, 1993

[51] Int. Cl.⁶ ............................................... C25D 1/12
[52] U.S. Cl. ............................. 204/299 R; 204/180.1; 345/107; 313/483
[58] Field of Search ......................... 204/299 R, 180.1; 313/483, 358; 345/107

[56] References Cited

U.S. PATENT DOCUMENTS

| | | |
|---|---|---|
| 3,612,758 | 10/1971 | Evans . |
| 4,093,534 | 6/1978 | Carter et al. ..................... 204/299 R |
| 4,203,106 | 5/1980 | Dalisa et al. . |
| 4,298,448 | 11/1981 | Muller et al. . |
| 4,408,202 | 10/1983 | Fales . |
| 4,655,897 | 4/1987 | DiSanto et al. . |
| 4,680,103 | 7/1987 | Beilin Solomon I. et al. . |
| 4,732,830 | 3/1988 | DiSanto et al. . |
| 4,889,603 | 12/1989 | DiSanto et al. ................. 204/299 R |

OTHER PUBLICATIONS

"Studies of the Breakdown Process in Dielectric Fluids Using High Speed Photography", *Journal of Electronics*, vol. 7 Y. Yamada, S. Saramoto, and Y. Nakado 1979 pp. 155-168.

ASTM Test #D 2300-85, *Annual Book of ASTM Standards Feb. 1991 pp. 302-307*.
"Solubility of Gases in Liquids", *Viscosity and Diffusivity* J. H. Hilderbrand and R. H. Lamoreaux 1977 pp. 49-66.
*Advanced Organic Chemistry*, 3rd Ed., John Wiley & Sons J. March 1985 pp. 724-726.
*Sterochemistry of Carbon Compounds*, McGraw Hill, N.Y. E. L. Eliel 1962 pp. 298-304.
*Physical Organic Chemistry*, John Wiley & Sons, NY. N. S. Isaacs 1987 pp. 282-292.

Primary Examiner—Donald J. Yusko
Assistant Examiner—Nimesh D. Patel
Attorney, Agent, or Firm—Arthur L. Plevy

[57] ABSTRACT

An electrophoretic suspension prepared in accordance with the present invention comprises a dielectric fluid having suspended therein a plurality of pigment particles movable between the electrodes of an EPID device in response to an electric potential applied thereto and an effective amount of at least one additive for chemically absorbing at least one gas in the fluid. To absorb hydrogen gas in the dielectric fluid, a hydrogen absorbing additive is dispersed therein. The molecule of the hydrogen absorbing additive has an aromatic C/H ratio of 1/0.8 or less, and preferably between 1/0.67 and 1/0.75. To absorb chlorine gas in the dielectric fluid, an effective amount of an chlorine gas absorbing compound is also preferably added thereto. The chlorine gas absorbing additive comprises a molecule having at least one double bond and may be a sterically strained alkene such 5-ethylidene-2-norbornene.

19 Claims, 1 Drawing Sheet

GAS ABSORPTION ADDITIVES FOR ELECTROPHORETIC SUSPENSIONS

BACKGROUND OF THE INVENTION

This invention relates to electro-optical display devices in general and, more particularly, to display panels employing electrophoretic dispersions for producing graphic data.

The electrophoretic effect is well known and the prior art is replete with a number of patents and articles which describe the effect. As will be recognized by a person skilled in the art, the electrophoretic effect operates on the principle that certain lo particles, when suspended in a medium, can be electrically charged and thereby caused to migrate through the medium to an electrode of opposite charge. Electrophoretic image displays (EPIDs) utilize the electrophoretic effect to produce desired images. In prior art EPIDs colored dielectric particles are suspended in a fluid medium that is either clear or an optically contrasting color as compared to the dielectric particles. The colored electrophoretic particles are then caused to selectively migrate to, and impinge upon, a transparent screen electrode, thereby displacing the fluid medium from the screen and creating the desired image.

For a suitable example of such devices using the electrophoretic effect, reference is made to U.S. Pat. No. 4,732,830 entitled ELECTROPHORETIC DISPLAY PANELS AND ASSOCIATED METHODS and issued to Frank J. DiSanto et al. on Mar. 22, 1988. In this patent, there is disclosed an electrophoretic display apparatus which includes a planar transparent member having disposed thereon a plurality of vertically extending, electrically conductive lines defining a grid. A plurality of horizontally extending, electrically conductive cathode lines are disposed on top of the vertical lines but are insulated therefrom by a thin insulating layer, thereby forming an XY matrix of electrodes. A conductive plate or anode is spaced above the line patterns and disposed therebetween is an electrophoretic dispersion of yellow pigment particles in a dark colored suspension medium. The particles are transportable within the suspension medium under the influence of an electric field, by selectively biasing the conductive lines or the conductive plate to attract them.

A variety of pigment particle and dispersion medium compositions are known in the art. See, for example, U.S. Pat. No. 4,298,448 entitled ELECTROPHORETIC DISPLAY issued on Nov. 3, 1981 to K. Muller et al. This patent describes an electrophoretic display which utilizes electrophoretic particles of various pigments dispersed in a suspension consisting of liquid paraffin, 1,2-trichlorotrifluoroethane, and a solvent dye. The pigments are coated with an organic material which contains a charge control agent to cause the particles to possess a uniform surface potential and thus allow the particles to move in a more controlled manner.

U.S. Pat. No. 4,680,103, entitled POSITIVE PARTICLES IN ELECTROPHORETIC DISPLAY DEVICE COMPOSITION issued on Jul. 14, 1987 to Beilin Solomon I et al. describes a suspension for an EPID system in which the pigment particles are coated with a organosilane derivative and dispersed within an aprotic solvent such as alkyl and aromatic nitriles, dialkysulfoxides, alkyl phosphoric triamide, dimethylformamide, nitroalkane, or mixtures thereof.

As can be gathered from an inspection of the aforementioned references, the plane containing the horizontally extending conductive lines is closely spaced to that containing the vertically extending conductive lines, thereby forming an X-Y matrix of insulated grid and cathode electrode elements. The aforementioned planes may, in fact, be three microns apart or less. Because of this close spacing, the application of potential differences between the grid and cathode elements can generate electric fields of great intensity. These fields can exceed five million volts per meter. The aggregate effect of these fields can be surprisingly large due to the great length of electrode lines present in the display. For example, for a grid electrode which has 1,280 four-inch lines, each line being divided into six tynes and each tyne having two edges, the effective edge-length of the grid lines is about one-mile. In addition, these tynes have a certain degree of microscopic and submicroscopic unevenness which results in local increases in field strength.

The above noted combination of intense field and many edges promotes the occurrence, on a continuous basis, of transient mini-arcs between the cathode and grid lines. Such transient electrical discharges can cause the breakdown of the dielectric dispersion medium used in the electrophoretic display. While the liquid quickly seals off the breakdown, there are chemical by-products left from the mini-arc. For a discussion of the electrical breakdown process of dielectric fluids generally, reference is made to an article by Y. Yamada et at. entitled "Studies of the Breakdown Process in Dielectric Liquids Using High Speed Photography", Journal of Electrostatics, Vol. 7 (1979), pp. 155–168.

Within the context of electrophoretic display suspensions, it will be readily appreciated that a variety of chemical reactions may occur as a result of the aforementioned electrical arcing. As suggested by the Yamada reference, for example, the breakdown of the solvent molecules is a highly probable result. In a typical EPID suspension containing carbon tetrachloroethylene, for example, the presence of hydrogen and chlorine in atomic and molecular form, or even the highly stable hydrogen chloride molecule, may be attributed to electrical discharges therein. Over time, these gases collect and produce bubbles in the display. J. H. Hildebrand et at. suggest that such gasses are highly soluble in non-polar solvents such as those used in electrophoretic display suspensions. See J. H. Hildebrand et al, *Viscosity and Diffusivity*, Chapter 7, pp. 49–66, John Wiley and Sons, New York (1977). However, although the solubility of the solvent may delay the appearance of gas bubbles as the breakdown process continues, the bubbles will eventually appear and thereby shorten the useful life of the electrophoretic dispersion.

Accordingly, it is an object of the present invention to provide a superior electrophoretic suspension having an operating life which is much greater than those utilized in conventional electrophoretic displays. It is a further object of the present invention to provide an electrophoretic display which advantageously utilizes such a suspension and which is both economical to fabricate and reliable to operate.

SUMMARY OF THE INVENTION

These objects, as well as others which may become apparent to those of ordinary skill in the field of the present invention, are provided by an electrophoretic display having a suspension which is adapted to absorb a substantially greater volume of the gasses produced by the electrical breakdown thereof. An electrophoretic suspension prepared in accordance with the present invention comprises a dielectric fluid having suspended therein a plurality of pigment particles movable between first and second electrodes of an EPID device in response to an electric potential applied thereto and an effective amount of at least one additive for chemically absorbing at least one gas in the fluid. To absorb hydrogen gas in the dielectric fluid, a hydrogen absorbing additive is dispersed therein. The molecule of the hydrogen absorbing additive has an aromatic C/H ratio of 1/0.8 or less, and preferably between 1/0.67 and 1/0.75. Hydrogen absorbing additives with C/H ratios in the preferred range include monobenzyl and dibenzyl toluene, phenyl xylyl ethanes, ditolyl ether, and diisononyl phthalate. To absorb chlorine gas in the dielectric fluid, an effective amount of an chlorine gas absorbing compound is also added thereto. The chlorine gas absorbing additive comprises a molecule having at least one double bond and may be a sterically strained alkene such as 5-ethylidene-2-norbornene. It is important to note that while the hydrogen absorbers are designed by the dielectric fluid industry for that purpose, the 5-ethylidene-2-norbornene molecule is simply a reactive strained alkene. As such, it is possible that it may absorb by reaction all three gasses mentioned, that is, chlorine, hydrogen, and hydrogen chloride, as well as other gaseous molecular fragments.

An electrophoretic display device fabricated in accordance with the present invention comprises a structure defining an enclosed space and including a first electrode and an opposed matrix structure having a second electrode and a third electrode with a dielectric spacer therebetween. Within the enclosed space of the device, a dielectric fluid is disposed having a plurality of pigment particles movable between positions adjacent the electrodes in response to an electric potential applied thereto operation. Suspended within the dielectric fluid is an effective amount of at least one additive for chemically absorbing at least one gas in the fluid. The breakdown of an EPID dielectric fluid comprising a non-polar solvent selected from the class consisting of tetrachloroethylene, aromatic hydrocarbons, fluorocarbons, xylene, and mixtures thereof is characterized by the presence of hydrogen and chlorine gasses in atomic and molecular form therein. Accordingly, a hydrogen absorbing additive, a chlorine absorbing additive, or both are employed in the electrophoretic suspension of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing wherein.

DETAILED DESCRIPTION OF THE INVENTION

Figure 1:
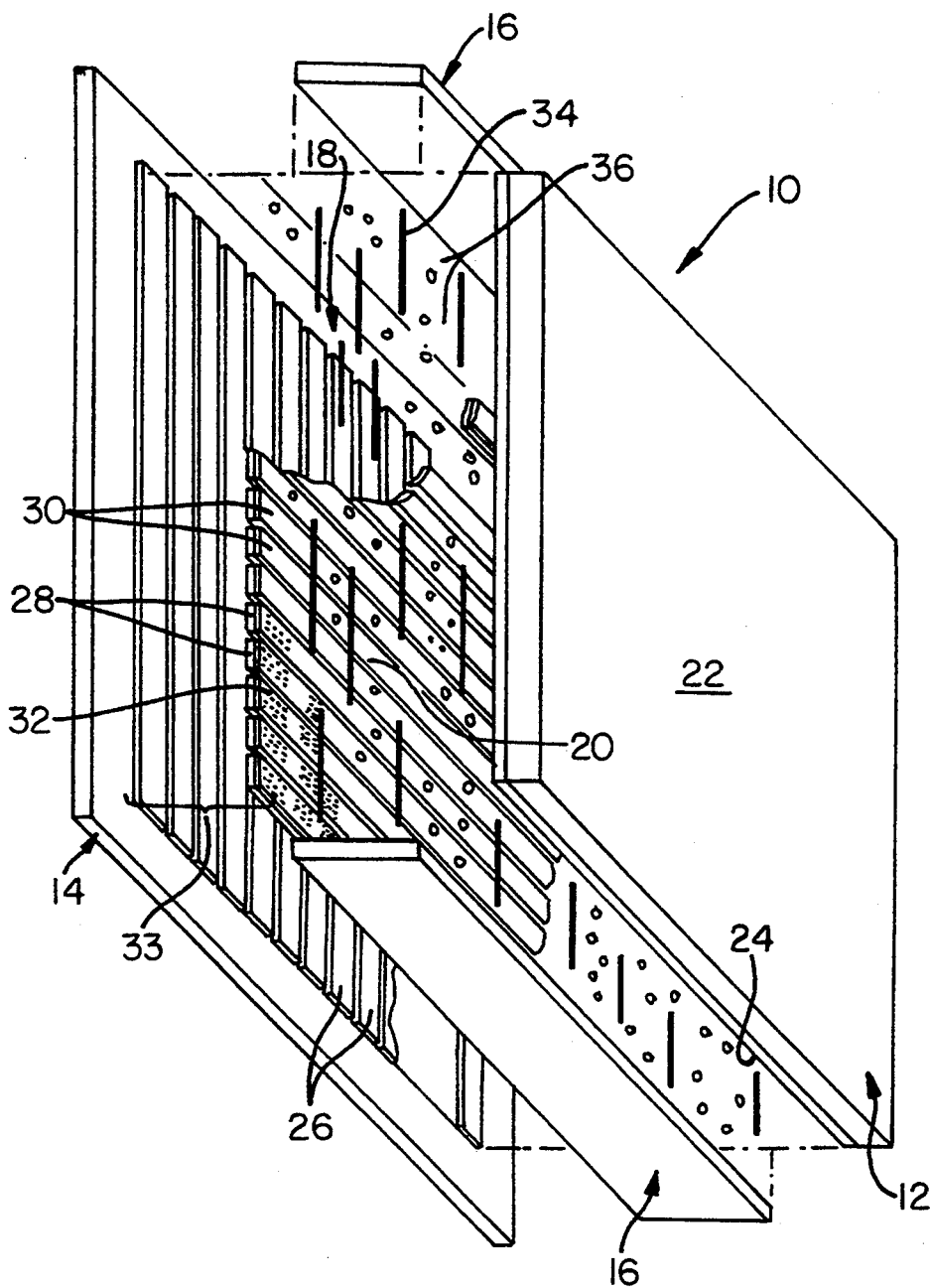
FIG. 1 is a simplified perspective view of an electrophoretic display device with portions partially cut away.

In its broadest aspects, the present invention is directed to the use of gas absorbing additives in electrophoretic display devices. Referring to FIG. 1, there is shown a simplified perspective view of an electrophoretic display device. Apart from the process of making the suspension, the display 10 can be fabricated in a manner as known in the art. The construction of such displays are well known and reference may be had to the aforementioned U.S. Pat. No. 4,732,830 to DiSanto et al., the disclosure of which is incorporated herein by reference, for details of the same. As shown in FIG. 1, a cell 10 includes a back panel 12, a front panel 14 and side panels 16 to define an enclosed space 18. The enclosed space is bounded by interior surfaces 20, with the cell exterior having exterior surfaces 22.

A layer of conductive material is deposited on one side of back panel 12 to serve as the anode 24. Substantially parallel strips 26 of a conductive material are deposited on one side of front panel 14 to serve as a set of cathodes. Each strip cathode is electrically isolated from adjacent strip cathodes. On top of cathodes 26 is deposited a layer of electrically insulating material 28. On top of layer 28 are deposited substantially parallel strips 30 of conductive material to serve as the control or grid electrodes. Adjacent grid electrodes 30 are also electrically isolated from one another.

The portions of insulator 28 exposed in between the grid electrodes are etched away in a conventional manner to expose small sections of the cathodes between the columns of grid electrodes. When cell 10 is viewed through back panel 12, the grid electrodes 30 overlap cathodes 26 in square or rectangular sections. Within each such section a number of wells 32 are etched into the grid electrodes and into the insulator layer underneath to expose portions of the cathode at the bottom of the wells. Cathodes 26, insulating material 28, and control electrodes 30 form X-Y matrix structure 33.

Back panel 12 is typically composed of glass or transparent plastic. Anode 24 is comprised of an electrically conductive metal or metal oxide, such as a mixture of indium oxide and tin oxide ("ITO") and may be applied to back panel 12 by means such as vacuum sputtering. Front panel 14 is also typically comprised of glass or transparent plastic and is coated with a layer of ITO, which, based on its thickness, is transparent. The cathode strip pattern is etched on the surface of the ITO layer on front panel 14 using conventional etchants as used in the integrated circuit art. The grid electrodes 30 may be comprised of ITO or some other electrically conductive material and may be applied to the insulating material 28 by vacuum evaporation or some other technique. Front panel 14 may extend beyond back panel 12 and carry means thereon (not shown) for conducting voltages to the anodes 24, control electrodes 30, and cathodes 26.

A dielectric, or suspending liquid 34 is disposed within the enclosed space 18 and typically fills the volume between the front and back panels and side panels of the cell and wells 32. Pigment particles are disposed in the suspension and function as a diffuse reflector when the particles are packed on the cathode. When a sufficient electrical bias is applied between the anode 24 and cathode 26, the electrophoretic particles migrate in response thereto to either the cathode 16 or anode 20 depending on polarity and displace the dark color medium 24 at the viewing surface, thereby creating a white pixel. Reversing the voltage produces a dark pixel.

Because the grid lines are spaced from the cathode lines by means of insulating layer 28, the spacing between the grid and cathode is on the order of 3 to 6 microns. As indicated in the Background of the Invention, the close proximity of the grid and cathode lines can result in the generation of electric fields in excess five of million volts per meter, thereby promoting the occurrence of transient mini-arcs between the cathode and grid lines and leading eventually to the breakdown of the solvent molecules and formation of gas bubbles in the dispersion. In order to greatly prolong the operating life of the display suspension, EPID suspensions prepared in accordance with the present invention include additives which absorb these gasses and thus delay the appearance of gas bubbles therein.

A typical solvent suspension which may be utilized contains a non-polar solvent medium which has been density matched to the particles so that the particles remain randomly dispersed therein, unaffected by the orientation of the EPID or the effects of gravity. For example, in U.S. Pat. No. 4,732,830 to DiSanto et al., the solvent comprised a mixture consisting mainly of tetrachloroethylene with a small amount of an aromatic hydrocarbon added thereto. In U.S. Pat. No. 4,203,106, entitled X-Y ADDRESSABLE ELECTROPHORETIC DISPLAY DEVICE WITH CONTROL ELECTRODE and issued to Dalisa et al. on May 13, 1980, there is disclosed an electrophoretic suspension utilizing xylene and perchloroethylene as the dielectric fluid. It is contemplated that the use of gas absorbing additives generally, as taught by the present invention, may be applied to any EPID dielectric fluid in which gasses are generated by electrical discharges therein.

The breakdown of the aforementioned and other non-polar solvents used in electrophoretic suspensions, resulting from the electrical discharges described above, is characterized by the presence of hydrogen in both the atomic and molecular form. In order to prevent hydrogen gas bubbles from forming, the suspension of the present invention therefore includes an effective amount of at least one additive which possesses excellent hydrogen absorbing properties. Examples of additives which may be employed for this purpose include monobenzyl toluene (MBT), dibenzyl toluene (DBT), or mixtures thereof (M&DBT), phenyl xylyl ethanes (PXE), ditolyl ether (DTE), and diisononyl phthalate (DINP). These compounds, by nature of their high aromatic C/H ratios (from 1:0.67 to 1/0.75), are excellent hydrogen gas absorbers. It will, of course, be understood by those of ordinary skill in the art that this invention contemplates the use of any hydrogen absorbing additives or mixtures thereof which meet the liquid state temperature range and low viscosity restrictions of an electrophoretic display.

Arcing in a typical electrophoretic suspension also produces atomic and molecular chlorine. It has, however, been observed that halogens will add readily to double bonds. Chlorine generally does so in the presence of ultra violet light. To employ this beneficial reaction, a suspension prepared in accordance with the present invention also include an additive which possess such double bonds but which also fulfills the broad liquid state temperature range and low viscosity restrictions imposed on any useful electrophoretic fluid. One class of chlorine absorbing additives which have been found by the present inventors to meet all of the aforementioned prerequisites are alkenes having sterically strained structure. The chemical structure of such an alkene, 5-ethylidene-3-norbornene, is illustrated by the following formula.

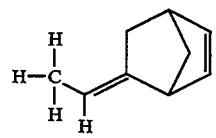

(I)

Both double bonds in this diene are under strain. The hydrogenation energy of the ring double bond is more than 21 kilojoules/mol exothermic greater than its unstrained analogue. The strain energy of the double bond outside the ring is estimated to be around 25 kilojoules per mol. The following examples illustrate the process of making suspensions which include a hydrogen and/or a chlorine absorbing additive.

EXAMPLE 1

Any known manner may be utilized to prepare the pigment particles of the electrophoretic suspension in which the additives of the present invention are employed. In this example, the hydrogen gas absorbing additive which is added to the solvent is M&DBT, produced by Prodelec Company under the trade name of Ugilec C101. M&DBT contains two related molecular species with two (MBT) or three (DBT) benzene rings connected by single aliphatic carbon atoms. Within the molecules, the $\pi$ electrons from the benzene rings can circulate from one ring to the other so as to form resonating structures in which the mobile $\pi$ electrons move in delocalized orbitals. These delocalized orbitals can accommodate one or two extra electrons to from stable negative ions. With aromatic C/H ratios of 1/0.75 and 1/0.72 respectively, these molecules are excellent hydrogen gas absorbers.

In the preparation of the suspension in accordance with this example, a yellow pigment was selected designated as AAOT yellow which is a pigment manufactured by Sun Chemical Company. The charge control agent and stabilizing agent employed with this pigment is OLOA 1200, a product of Chevron Corporation. OLOA 1200 is a polybutene succinimide with a basic anchoring group and an extended polyisobutylene chain. The particles are prepared by ballmilling all components for about eight hours. This is done to break up the dry agglomerated pigment powder into individual particles and allow the exposed surface to interact with the stabilizer. During milling the temperature of the suspension rises to a little over 40° C.

The media used in the milling procedure are 2.0 mm zirconium beads having a density of 6.0 g/ml. During the milling procedure, some of the OLOA-1200 is adsorbed into the surface of the beads, forming a coating thereon. After the final milling, the suspension is strained from the beads. At this point, the specific gravity of the mix is measured. If necessary, it is adjusted to make sure it is slightly more dense than the pigment. The suspension is divided into centrifuge tubes and spun at 5000 RPM for 30 minutes. The suspension is transferred to fresh test tubes by carefully drawing out the pigment and most of the liquid. A small amount of liquid and grey-weight dense solid, which has settled out, are left behind. The primary source of the residue is the zirconium oxide. The process of transferring to fresh tubes is repeated three times to ensure adequate removal of unwanted particulate matter. In order to produce the EPID suspension, the resulting mixture was homogenized for about 60 sec using ultrasound (Model UP150, instrument of Sonicor, Inc.) and filled as the suspension into an EPID cell (test cell in accordance with FIG. 1).

The suspension exhibited excellent properties in the EPID cell and accelerated Life tests project a fivefold increase in operating life as the result of the addition of the hydrogen absorbing additive. This is in comparison to tetrachloroethylene solvent-based suspensions prepared without a hydrogen absorbing additive (see Example 4 below). The composition and physical properties of the suspension for an electrophoretic display is depicted in Table 1.

TABLE I

| | | |
|---|---|---|
| Yellow pigment, AAOT, product of Sun Chemical Co., | concentration | 0.8% (by wt) |
| Solvent Blue 35 (SB35) blue dye, #30,643-6, product of Aldrich Co., 1,4-Bis(butylamino)-9,10-anthracenedione | concentration | 0.12% |
| OLOA 1200 stabilizer and charging agent, product of Chevron Chemicals Co. | concentration | 0.4% |
| Tetrachloroethylene and secondary-butyl benzene, background solvent adjusted to a density of 1.43 g/ml | concentration | 92.7% |
| M&DBT, $C_{14}H_{14}$ and $C_{21}H_{20}$, product of Prodelec Company, density of 1.006 g/ml | concentration | 6.0% |

EXAMPLE 2

The operations were the same as in example 1, but with the difference that in addition to the 6% of M&DBT, 6% of 5-ethylidene-2-norbornene, a sterically strained alkene, was added to the suspension for the absorption of chlorine therein. The background solvent was correspondingly reduced to a concentration of 86.7%. The suspension produced in an otherwise identical manner displayed excellent properties similar to those in example 1 when tested. Moreover, operating life tests of the display suspension indicate an increase by a factor of ten over tetrachloroethylene solvent-based suspensions prepared without either additive.

EXAMPLE 3

The operations were the same as in example 1, but with the difference that 6% of phenyl xylyl ethanes (PXE), $C_{16}H_{18}$, was substituted for the M&DBT. PXE is produced by Nippon Oil Company under the trade name of Niseki Oil S and has two aromatic rings that are separated by two aliphatic carbon atoms, thus preventing an interchange of $\pi$ electrons between the two rings. The supply of mobile electrons is, therefore, limited. With an aromatic C/H ratio of 1/0.67, PXE is an excellent hydrogen absorber. Its low density of 0.988 g/ml and its viscosity of 8.0 Cs make it suitable for use in an electrophoretic display. The suspension produced using PXE displayed excellent properties similar and in part superior to those reported in example 1 when tested. The operating life was also found to be similar to that found in example 1.

EXAMPLE 4 (FOR COMPARISON)

The operations were the same as in example 1, but with the omission of any gas absorbing additive. The dispersion thus obtained and filled as the suspension into an EPID cell (test cell in accordance with FIG. 1) was used to set the base line for operational testing. This experiment serves as a basis for evaluating the increases in operating life which are obtained utilizing various gas absorbing additives in accordance with the preceding examples which illustrate the present invention.

Further possibilities of modification of the invention with respect to design, fabrication, operation, and application of EPID cells are within the capabilities of those familiar with the state of the art.

What is claimed is:

1. An electrophoretic display comprising:
   a structure defining an enclosed space and including a first electrode and an opposed matrix structure, said matrix structure having a second electrode and a third electrode with a dielectric spacer therebetween; and
   a dielectric fluid disposed within said enclosed space, said dielectric fluid having a plurality of pigment particles movable between positions adjacent said electrodes in response to an electric potential applied to said electrodes during an operation of said electrophoretic display, said electric potential causing arcing between said second and third electrodes of said matrix structure, said arcing causing a chemical breakdown of said fluid, said chemical breakdown of said fluid resulting in the generation of hydrogen gas, chlorine gas, and hydrogen chloride gas in said fluid wherein said dielectric fluid includes an effective amount of at least one additive for absorbing said at least one of said gases in said fluid to substantially reduce said at least one of said gases in said fluid, said at least one additive having a liquid state temperature range and a viscosity suitable for use in said electrophoretic display.

2. A display according to claim 1, wherein said at least one additive comprises a hydrogen absorbing additive.

3. A display according to claim 2, wherein said hydrogen absorbing additive comprises a compound having an aromatic C H ratio of 1/0.67 to 1/0.75.

4. A display according to claim 3, wherein said hydrogen absorbing additive is selected from the class consisting of monobenzyl and dibenzyl toluene, phenyl xylyl ethanes, ditolyl ether, and diisononyl phthalate.

5. A display according to claim 2, wherein said at least one additive further comprises a second additive for absorbing said chlorine and hydrogen chloride gases.

6. A display according to claim 5, wherein said second additive comprises a molecule having at least one double bond.

7. A display according to claim 6, wherein said second additive is selected from the class consisting of sterically strained alkenes.

8. A display according to claim 7, wherein said second additive is 5-ethylidene-2-norbornene.

9. A display according to claim 1, wherein said dielectric fluid comprises a non-polar solvent.

10. A display according to claim 1, wherein said non-polar solvent is selected from the class consisting of tetrachloroethylene, aromatic hydrocarbons, fluorocarbons, xylene, and mixtures thereof.

11. A composition for use in an electrophoretic display device having first and second electrodes, comprising:
   a dielectric fluid;
   a plurality of pigment particles disposed in said dielectric fluid; and
   an effective amount of at least one additive for absorbing at least one of three gases comprising hydrogen gas, chlorine gas, and hydrogen chloride gas, generated in said fluid when said fluid is used in the display device, said gases being caused when an electric potential is applied to the first and second electrodes causing arcing therebetween which chemically breakdowns said fluid thereby resulting in the generation of said gases, wherein said at least one additive comprises a liquid state temperature range and a viscosity suitable for use in the electrophoretic display;

whereby said at least one additive substantially reduces said at least one of said three gases in said fluid.

12. A composition according to claim 11, wherein said at least one additive is a hydrogen absorbing additive.

13. A composition according to claim 12, wherein said hydrogen absorbing additive comprises a compound having an aromatic C°H ratio of 1:1/0.75 to 1/0.67.

14. A composition according to claim 13, wherein said hydrogen absorbing additive is selected from the class consisting of monobenzyl and dibenzyl toluene, phenyl xylyl ethanes, ditolyl ether, and diisononyl phthalate.

15. A composition according to claim 12, wherein said at least one additive further comprises a second gas absorbing additive capable of absorbing said chlorine and said hydrogen chloride gases.

16. A composition according to claim 15, wherein said second gas absorbing additive comprises a molecule having at least one double bond.

17. A composition according to claim 16, wherein said second gas absorbing additive is selected from the class consisting of sterically strained alkenes.

18. A composition according to claim 17, wherein said second gas absorbing additive is 5-ethylidene-2-norbornene.

19. An electrophoretic display comprising:
a structure defining an enclosed space and including a first electrode and an opposed matrix structure, said matrix structure having a second electrode and a third electrode with a dielectric spacer therebetween; and
a dielectric fluid disposed within said enclosed space, said dielectric fluid having a plurality of pigment particles movable between positions adjacent said electrodes in response to an electric potential applied to said electrodes during an operation of said electrophoretic display, said electric potential causing arcing between said second and third electrodes of said matrix structure, said arcing causing a chemical breakdown of said fluid, said chemical breakdown of said fluid resulting in the generation of hydrogen gas, chlorine gas, and hydrogen chloride gas in said fluid wherein said dielectric fluid includes an effective amount of at least one additive for absorbing said chlorine gas and said hydrogen chloride gas, said at least one additive having a liquid state temperature range and a viscosity suitable for use in said electrophoretic display.

* * * * *